United States Patent [19]

Markow

[11] Patent Number: 5,000,518

[45] Date of Patent: Mar. 19, 1991

[54] TIRE SIDEWALL AUGMENTATION DEVICE

[75] Inventor: Edward G. Markow, Oakdale, N.Y.

[73] Assignee: Grumman Aerospace Corporation, Bethpage, N.Y.

[21] Appl. No.: 503,108

[22] Filed: Apr. 2, 1990

Related U.S. Application Data

[63] Continuation of Ser. No. 198,012, May 24, 1988, abandoned.

[51] Int. Cl.⁵ .................. B60C 17/06; B60C 17/04
[52] U.S. Cl. .................. 301/39 T; 301/40 S; 152/517; 152/520
[58] Field of Search .......... 152/517, 520, 158; 301/38 R, 38 S, 39 R, 39 T, 39 C, 40 S

[56] References Cited

U.S. PATENT DOCUMENTS

| | | | |
|---|---|---|---|
| 1,766,393 | 6/1930 | Mehs | 301/39 T |
| 2,203,774 | 6/1940 | Cornelissen | 301/38 R |
| 2,670,994 | 3/1954 | Parrott | 301/39 T |
| 3,208,798 | 4/1964 | Peters | 301/38 R |
| 3,397,014 | 8/1968 | Nigrelli | 301/39 T |
| 3,508,790 | 4/1970 | Holmes | 301/39 T |
| 4,158,468 | 6/1979 | Bass et al. | 301/39 T |

FOREIGN PATENT DOCUMENTS 1066702  11/1952  France .................. 301/38 R Primary Examiner—Michael W. Ball
Assistant Examiner—Gregory J. Wilber
Attorney, Agent, or Firm—Pollock, VandeSande & Priddy

[57] ABSTRACT

A large annular ring is secured to a wheel rim to augment the load capability of a tire when it is partially or nearly fully deflated. The ring includes an outer elastomeric pad which contacts the ground as a tire collapses. An intermediate length of the ring serves as a brace against the buckling sidewall. As a result, the majority of load is assumed by the ground-engaging ring but the ring, in a state of equilibrium, braces the outwardly buckling sidewalls of the tire so that the collapsing tire is still capable of assuming a portion of the load.

3 Claims, 1 Drawing Sheet

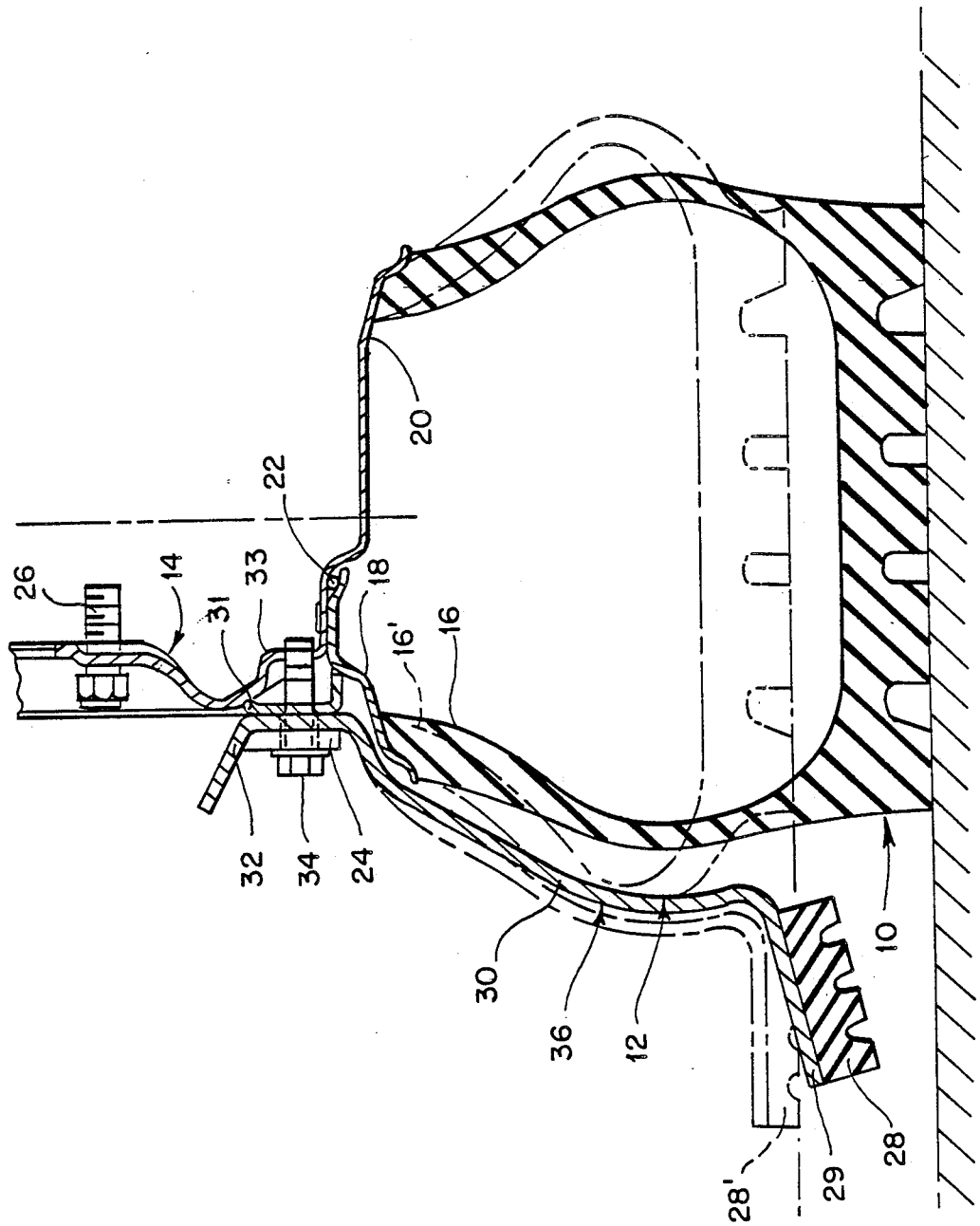

TIRE SIDEWALL AUGMENTATION DEVICE

This application is a Continuation, of application Ser. No. 198,012, filed May 24, 1988, now abandoned.

FIELD OF THE INVENTION

The present invention relates to tires, and more particularly to a tire attachment which supports a vehicle load when the tire experiences deflation.

BACKGROUND OF THE INVENTION

The dangers and inconvenience of deflated and flat tires are well known. In addition, the marked decrease in performance of a vehicle becomes apparent even when a vehicle experiences substantial deflation in a single wheel. These problems become amplified for military vehicles wherein flat or deflated tires cannot be expected to be changed under battle conditions. Further, the weight of such vehicles often makes tire changes impractical or impossible.

Accordingly, there has been a long continuing need for a wheel attachment which could cooperate with a tire to assume a substantial load in the event of substantial tire deflation or flat tire condition. However, such a device must be designed so that it in no way interferes with the normal performance of a tire.

BRIEF DESCRIPTION OF THE INVENTION

The present invention accomplishes the dual requirement that it does not interfere with the normal performance of a tire and it is capable of assuming a substantial load while cooperating with a tire even when the latter is in a deflated condition.

Structurally, the present invention generally is characterized as an annular ring that is clamped along an inner circular edge to the rim of a wheel. The outer circular edge has an outwardly extending rubber pad which engages the ground when the tire is substantially deflated. During such deflation conditions the tire sidewall bulges outwardly until it contacts the ring. The ring is forced outwardly as the tire deflates until the tire becomes flat enough to cause contact between the pad and the ground. When this occurs sufficient frictional forces are generated so that further lateral displacement of the ring is stopped. An equilibrium condition is developed whereby the ring exerts a counterforce against the bulging tire sidewall. The counterbalancing force includes a vertical component which assumes a substantial proportion of the vehicle load. Accordingly, the present tire augmentation device cooperates with a deflated tire to share vehicle load.

BRIEF DESCRIPTION OF THE FIGURE

The above-mentioned objects and advantages of the present invention will be more clearly understood when considered in conjunction with the accompanying drawing, in which:

The FIGURE is a partial cross-sectional view through the present augmentation device as mounted on a vehicle wheel in conjunction with the tire.

DETAILED DESCRIPTION OF THE INVENTION

The FIGURE illustrates the utilization of a single augmentation device positioned laterally to the left of a tire. The following discussion will pertain to such a single augmentation device, although it is to be understood that a separate second augmentation device or a partial extension of the rim structure may be installed at a laterally opposite side of the illustrated tire.

The conventional tire, generally illustrated by reference numeral 10, is shown in half cross section, wherein the lower portion of the tire is illustrated. The augmentation device 12 of the present invention is also shown in partial cross section and, in fact, is a full annular ring which is maintained in normal spaced relationship from the tire sidewall 16, as will be explained hereinafter. The augmentation device of the present invention is secured to a rim generally indicated by reference numeral 14. The illustrated rim is actually a two-part rim employed extensively for military vehicles due to the customary utilization of tires that are quite stiff and difficult to mount on a rim of unitary construction. The conventional rim 14 is indicated as including a first annular section 18 and a second annular section 20, each of which mounts respective beads of the tire carcass in conventional fashion. An O-ring seal 22 prevents loss of air between the rim sections 18 and 20 from the pressurized interior volume of the tire. Conventional lug nuts such as lug nut 26 are employed to mount the rim 14 to a vehicle wheel (not shown).

A clamping bolt 34 secures flanges 31 and 33 of respective rim sections 18 and 20 together through an intermediary annular clamping ring 24. The upper illustrated or inner edge portion of the augmentation device 12 has a generally U-shaped flange section 32 which is seated against the rim flange 31 by the clamping ring 24. An outwardly bowed intermediate section 30 of the augmentation device 12 is normally positioned approximately one inch away from the sidewall 16 of tire 10. The outward or lower illustrated edge portion 29 of the augmentation device 12 is located above the ground surface and mounts an elastomeric treaded pad 28. As will be clearly seen from the FIGURE, the pad is normally maintained in an outwardly extending oblique angle relation to the ground surface.

In operation of the augmentation device 12, the solid illustrated disposition of the augmentation device occurs during normal inflation conditions of tire 10. The spaced relationship between the intermediate section 30 of the augmentation device and the tire sidewall 16 is clearly illustrated.

When the tire has undergone substantial deflation, the sidewall 16 buckles outwardly until it contacts the intermediate section 30 of the augmentation device 12. As the tire collapses, contact is made between treaded pad 28 and the ground and the pad maintains a horizontal position as shown in dotted lines by 28'.

Friction between the ground and the lower surface of the treaded pad prevents further outward displacement of the augmentation device 12 so that the bulging sidewall 16' is braced against further outward displacement. As a result, the intermediate section 30 of the augmentation device develops a restoring force through the lower bulge of the tire, the restoring force having a vertical force component that permits continued load bearing by the tire. In addition, the stiffness of the metal or high-strength, non-metallic composite augmentation device permits it to successfully transfer load forces between the pad at 28' and rim 14. Experimentation has demonstrated that, for an almost completely deflated tire, the augmentation device will assume 80 percent of a load while the deflated tire will still maintain 20 percent of the load. Thus, it will be appreciated that one aspect of the present invention is that the augmentation device cooperates with a deflated tire to share load distribution.

In an alternate operating circumstance wherein partial tire deflation occurs, contact will be made between the sidewall 16 and augmentation device 12 at contact point 36 although the pad 28 remains above the ground in non-contacting relationship. As a result of this contact, the augmentation device again serves as a brace and reinforces the load-bearing capability of the sidewall. Thus, during partial deflation of the tire, the tire is able to assume a full load due to the cooperating assistance of the bracing augmentation device 12.

By virtue of the foregoing description of the invention, it will be appreciated that the present augmentation device 12 increases the ability of a tire to assume its portion of vehicle load and maintain adequate performance while in a partial or full deflation condition.

An additional operating circumstance relates to overload caused by impact. Although the augmentation device may be designed for a steady state overload of 50 percent, a transient impact up to 6 g may be resisted by transient column stability of the disk and the pad frictional contact.

Benefits of the concept for military applications relate to reducing the sidewall infrared signature when operating pressurized and reducing the probability of puncture of the sidewall due to fragmentation ordinance, surface shrapnel, or natural terrain features.

It should be understood that the invention is not limited to the exact details of construction shown and described herein for obvious modifications will occur to persons skilled in the art.

I claim:

1. In conjunction with a tire having a bead received within a wheel rim, the bead extending to sidewalls interconnected by a threaded crown, a tire augmentation device having at least one generall annular member secured at an interior edge thereof to the rim and comprising:
   a laterally movable curved intermediate section overlying a tire sidewall in spaced relation thereto;
   a ring-shaped elastomeric pad extending laterally outwardly from an outward edge of the intermediate section, at a diameter less than that of the tire, for contacting a ground surface when the tire is substantially deflated;
   the intermediate section being sufficiently laterally movable to bow outwardly until the pad frictionally restrains further bowing;
   wherein an equilibrium condition is developed whereby the intermediate section exerts a counterforce against the bulging tire sidewall, the force including a vertical component which assumes a substantial portion of the vehicle load while the remainder of the load is assumed by the deflated tire.

2. The structure set forth in claim 1 wherein the outward surface of the pad is treaded.

3. The construction set forth in claim 1 wherein the curved intermediate section is continuous, and further wherein the section exerts a continuous circumferential counterforce against a bulging tire sidewall.

* * * * *